United States Patent [19]
Ridler

[11] Patent Number: 5,249,613
[45] Date of Patent: Oct. 5, 1993

[54] DEBARKING/DELIMBING APPARATUS

[76] Inventor: Ken Ridler, 705 Confederation Ct., Thunder Bay, Canada, P7E 3N2

[21] Appl. No.: 940,842

[22] Filed: Sep. 4, 1992

[51] Int. Cl.$^5$ .............................................. B27L 1/00
[52] U.S. Cl. ............................... 144/208 J; 144/3 R; 144/2 Z; 144/337; 144/341; 144/343
[58] Field of Search ............. 241/101.7; 144/2 Z, 144/1 R, 3 R, 3 D, 208 J, 337, 341, 343, 369

[56] References Cited

U.S. PATENT DOCUMENTS

| | | | |
|---|---|---|---|
| 2,713,365 | 7/1955 | Rauting | 144/208 J |
| 4,719,950 | 1/1988 | Peterson et al. | |
| 4,784,195 | 11/1988 | Eggen | 144/337 |
| 4,889,169 | 12/1989 | Peterson et al. | 144/208 J |
| 4,947,909 | 8/1990 | Stroud | 144/357 |
| 5,148,844 | 9/1992 | Robison | 144/208 J |

FOREIGN PATENT DOCUMENTS 05852 10/1987 PCT Int'l Appl. ................. 144/357

Primary Examiner—W. Donald Bray
Attorney, Agent, or Firm—Hoffman, Wasson & Gitler

[57] ABSTRACT

A debarking/delimbing apparatus having upper and lower flail drums mounted diagonally relative to a feed line of the apparatus and the upper and lower flail drums being mounted transverse to one another. The upper flail drum moves towards and away from the feed line to accommodate various size logs. The diagonal mounting of the flail drums utilizes a greater amount of the flail surface area of each drum thereby allowing the flails to wear more evenly and prolonging their life.

21 Claims, 2 Drawing Sheets

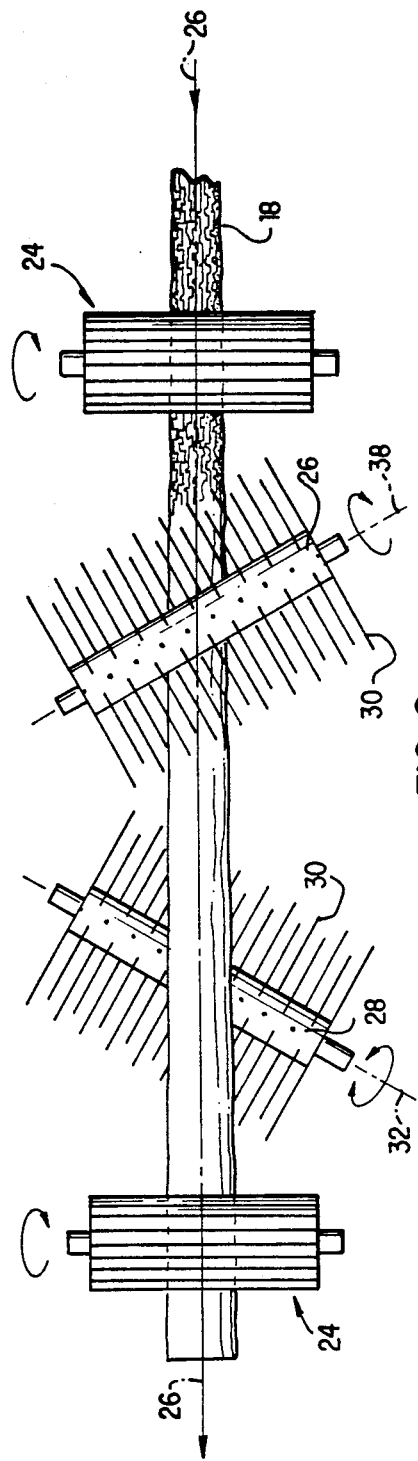
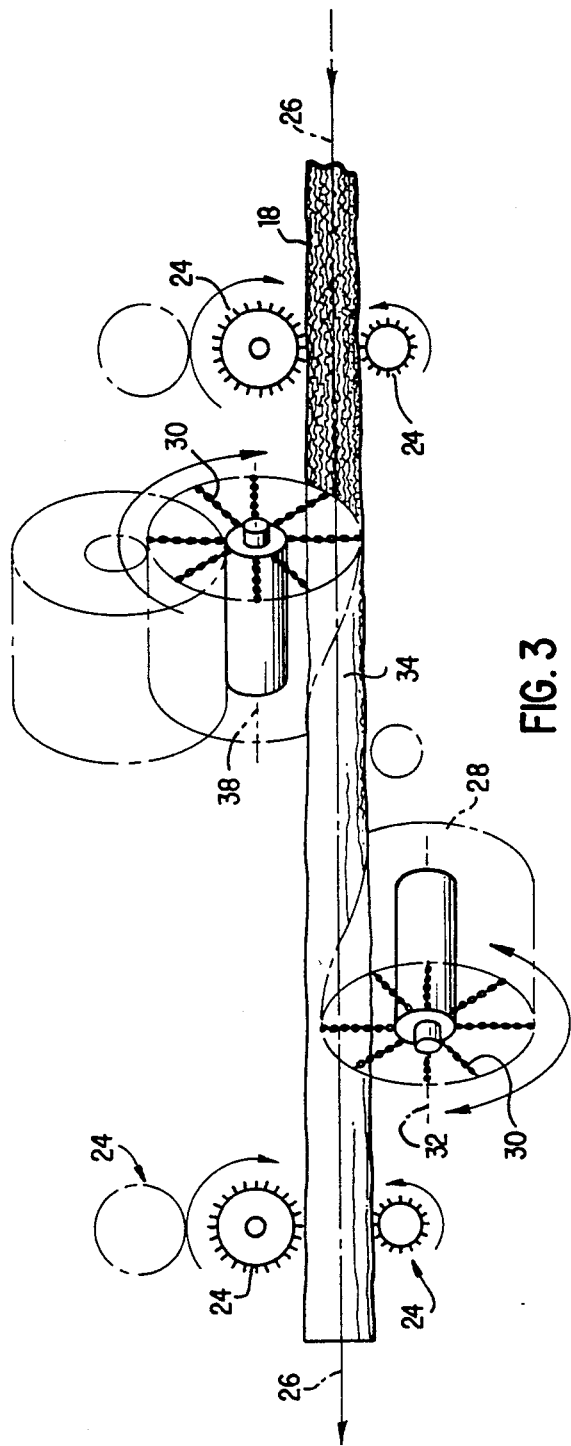

ically mounted on a trailer which is towed behind a large truck or vehicle. The apparatus of the present invention is designed to function as a complete unit.

DEBARKING/DELIMBING APPARATUS

FIELD OF THE INVENTION

The present invention relates to an apparatus for debarking and delimbing tree trunks and tree limbs. Whole trees are fed through the apparatus along a feed line. Flail drums, mounted above and below the feed line, are oriented diagonally relative to the feed line and rotate to remove the bark and small limbs prior to chipping of the logs and limbs.

BACKGROUND OF THE INVENTION

The harvesting of trees for use as lumber or wood chips involves the removal of bark. Conventional debarking/delimbing machines, such as those disclosed in U.S. Pat. No. 4,719,950, process logs by passing them between a pair of rotating flail drums. Each drum has a series of flails, chains, cables or other known flailing elements extending radially outward. As the drums rotate, the chains flail against the tree trunk to remove small limbs and bark. In conventional known debarking and delimbing machines, the flail drums are mounted above and below the path that the logs follow through the apparatus (feed line). The flail drums are mounted perpendicular to feed line. The U.S. Pat. No. 4,719,950 is directed to an apparatus which is adaptable to various size trees. An upper flail drum is pivotally moved towards and away from the feed line in response to mechanical actuation of a gate.

Logs have a generally circular cross-section, and therefore, as they are fed through the apparatus, the chains at the center of the flail drums come into contact with the logs more often than the chains towards the outer edges of the drums. Consequently, the chains at the center of the drums will wear out faster than the chains at the outer edges. When the center chains are worn to a degree, whereby they no longer function properly, the entire series of flail chains must be replaced or rearranged.

Conventional debarking and delimbing machines are designed to be mounted on trailers which are towed behind a large truck or vehicle. Typically, these debarking/delimbing trailers are at least 50 feet in length. Consequently, the towing vehicle and trailer are difficult to maneuver around sharp turns and through dense forest. Furthermore, conventional debarking and delimbing trailers require more than one person to operate. One person is required to drive the towing vehicle and at least one other person is needed to operate the debarking and delimbing machine.

In view of the foregoing, it is an object of the present invention to provide a debarking/delimbing apparatus in which the life of the flails on the flail drums is extended.

A further object of the present invention is to provide a debarking/delimbing apparatus in which the chains along the entire length of the flail drums wear more evenly.

Another object of the present invention is to provide a debarking/delimbing apparatus in which the apparatus is self-propelled.

Another object of the present invention is to provide a debarking/delimbing apparatus which can be operated by a single operator.

Another object of the present invention is to provide a debarking/delimbing apparatus which has an articulated frame to permit greater maneuver ability.

The foregoing and additional objects are accomplished by the present invention as set forth in the specification and in the drawings.

SUMMARY OF THE INVENTION

The debarking/delimbing apparatus according to the present invention includes a series of devices which are mounted on a frame so that they can be controlled by an operator situated at a console in a cab. The operator can also drive the debarking/delimbing apparatus to another location from the cab. Trees are fed into the apparatus, to remove small limbs, leaves and bark, and are moved forward by feed rollers to a chipping device. The chipping device has a revolving disc with knives and anvils to produce chips and deliver them by a feed shoot to mobile chip vans or other vehicles.

The debarking/delimbing apparatus has a flailing device which includes a pair of flail drums mounted above and below the feed line through which the logs pass. Each of the flail drums is mounted diagonally to the feed line. Bark and small limbs are removed as the trees pass between the flail drums.

The upper flail drum can be raised or lowered relative to the trees in the feed line to accommodate different size trees. The raising and lowering of the upper flail drum occurs in response to a signal indicating the size of the tree. Such a signal can be produced by any manner of means such as an electric eye.

The bottom flail drum is mounted diagonally relative to the feed line and is transverse to the diagonally mounted upper flail drum. The lower flail drum is fixed and does not move relative to the feed line.

By mounting the upper and lower flail drums on diagonals transverse to one another, a greater percentage of the surfaces of the flail drums are utilized to remove the bark and limbs. Conventional machines have flail drums mounted at right angles to the feed line and primarily use the central portion of the flail drums resulting in uneven wear, and necessitating more frequent replacement of the flails. On the other hand, the present invention utilizes a greater percentage of flails per flail unit, achieving more even wear of the flail surfaces, thereby prolonging the life of the flails.

BRIEF DESCRIPTION OF THE DRAWINGS

The following detailed description of the preferred embodiment can best be understood by reference to the enclosed drawings in which:

FIG. 2 is a top view of the debarking and delimbing section of the apparatus; and FIG. 3 is a perspective view of the debarking and delimbing section shown in FIG. 2.

DETAILED DESCRIPTION OF THE PREFERRED EMBODIMENT

Figure 1:
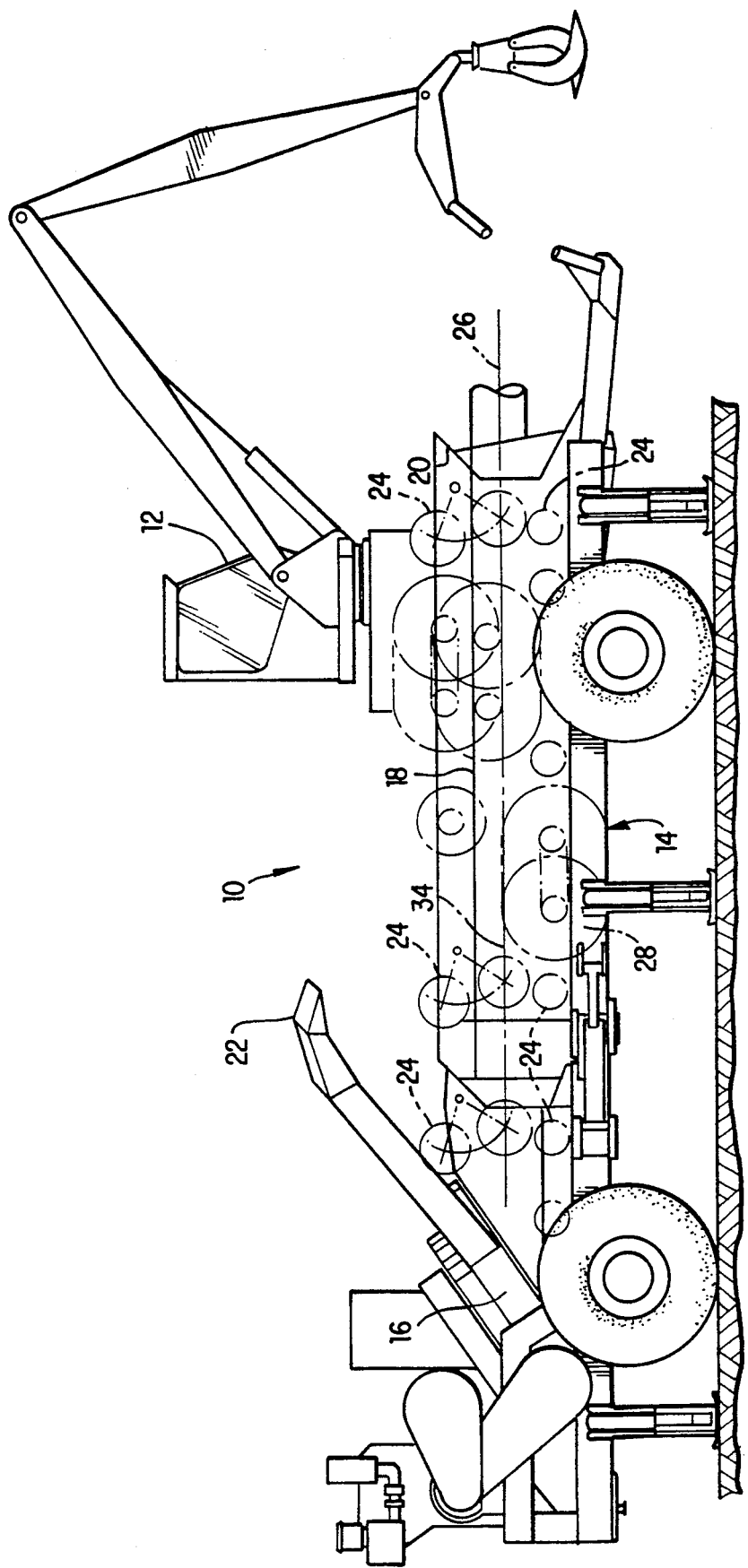
FIG. 1 is a side elevational view of the delimbing/debarking apparatus according to the present invention.

Referring to FIG. 1, the debarking/delimbing apparatus 10 of the present invention includes an operator's console 12 situated in a cab 13, a debarking/delimbing section 14 and a chipping device 16. Trees 18 are fed into open end 20 of the debarking/delimbing apparatus 10. The chipping device 16 is located downstream of the debarking/delimbing section 14 and processes the trees 18 into chips after the bark and limbs have been removed. The chips are fed out of a feed shoot 22 into vans or other vehicles.

The debarking/delimbing section 14 includes a series of drive rollers 24 positioned above the feed line 26. The drive rollers 24 rotate clockwise as shown in FIG. 2 to drive a log 18 from right to left through the debarking-/delimbing section 14 and into the chipping device 16. A lower flail drum 28 is disposed below the feed line 26, and is mounted in a fixed position so that it cannot move relative to the feed line 26. The flails 30 on the lower flail drum 28 extend radially outward from the axis 32 of the lower flail drum 28 so that they extend up past the center line 34 of a tree 18 passing through the apparatus 10.

An upper flail drum 36 is disposed above the feed line 26 and the flails 30 extend radially outward therefrom in a manner similar to the lower flail drum 28. The upper flail drum 36 may be moved vertically towards and away from the feed line 26 to accommodate the various size trees 18. The upper feed drum moves in response to a signal which may be sent from either the operator at the operator console 12 or from an electric eye which senses the size of the log 18 as it enters the apparatus 10. The flails 30 extending radially from the upper flail drum 36, are long enough to extend past the center line 34 of a log 18 passing through the apparatus 10 along the feed line 26.

As illustrated most clearly in FIGS. 2 and 3, a log 18 is fed from right to left along the feed line 26 through the debarking/delimbing section 14 to the chipper 16. The drive rollers 24 rotate clockwise to feed the tree 18 through debarking/delimbing section 14. Both FIGS. 2 and 3 show the upper and lower flail drums 36 and 28, respectively positioned diagonally relative to the feed line 26. Both the upper and lower flail drums 36 and 28 are oriented at an angle relative to the feed line greater than 0° and less than 90°. In the example illustrated in FIGS. 2 and 3, the axis 32 of the lower flail drum 28 is disposed at a 60° angle to the feed line 26, while the axis 38 of the upper flail drum 36 is disposed at a 120° or −60° angle to the feed line 26. As a consequence of this configuration, a greater number of flails 30 extending radially from the flail axes 38 and 32 of the upper and lower flail drums 36 and 28 come into contact with the surface of the tree moving along the feed line 26. Furthermore, more of the flails 30 experience the same amount of wear. Therefore, the wear on the various flails 30 of each flail drum is more evenly spread out.

On the other hand, in a conventional debarker and delimber, the flail drums are disposed at a 90° angle to the feed line. Only the central flails come into contact with a tree fed through the apparatus. Therefore, the central flails wear much quicker than the outer flails, reducing the life of the flails.

The conventional apparatus have flails arranged in lines parallel to the axis of the flail drums so that they extend radially outward. The lines of flails, or flail units, are interconnected, and consequently must be replaced simultaneously. Therefore, as soon as any flail on a flail unit is over-worn, the entire unit must be replaced or rearranged. Due to the predominately circular cross-sections of logs, the center flails are the first to wear out.

By orienting the flail drums 28 and 36 at angles relative to the feed line 26, and thereby increasing the amount of working flail surface area, the life of both flails is prolonged. While the illustrated embodiment shows the flail drums disposed at ±60° relative to the feed line 26, any angle greater than 0° and less than 90° would work. Flail drums oriented at 45° relative to the feed line would provide the greatest amount of flail drum surface area contacting the logs 18.

Conventional debarking and delimbing apparatuses are mounted on trailers which are pulled by trucks/tractors or other large vehicles. Typically, these trailers are 50 feet or longer in length. At least two people are necessary to operate these machines, one to drive the vehicle and at least one to operate the debarking and delimbing apparatus. The present invention provides a vehicle which can be operated by one person sitting in the cab 13. From this position, the operator can operate the debarking and delimbing apparatus or drive the vehicle to a new location. By reducing the number of people necessary to operate the machine, significant savings are incurred.

Further advantage of the present invention is the use of an articulated frame. Conventional debarking and delimbing apparatuses can pivot only at the point where they connect to the towing vehicle. As a result, these vehicles are difficult to maneuver, and having difficulty accessing remote locations. The present invention includes an articulated frame so that it can pivot about its hinged center point 50. As a result of this configuration, the debarking and delimbing apparatus of the present invention can maneuver through much tighter turns than conventional machines thereby accessing much more remote and difficult areas. Furthermore, typical debarking and delimbing apparatuses are mounted on trailers at least 50 feet long. As shown in FIG. 1, the travel length of the present debarking/delimbing apparatus is approximately 39 feet. Therefore, the maneuverability of the present invention is significantly higher than the maneuverability of conventional devices.

The design of the debarking and delimbing section of the present apparatus is such that the yield of chip production increases by 15 to 20% due to the use of limbs in the chipping process. The debarking and delimbing section is capable of removing all the bark and most of the limbs having diameters below two inches. The remaining limbs stay on the tree and are fed to the chipping section where they are turned to chips. If all the limbs were removed prior to debarking, the chip production would be significantly less.

While the illustrated embodiments show the debarking and delimbing apparatus mounted on a vehicle for use at remote locations, the debarking and delimbing section can be located at a lumber mill or other appropriate location and instead of chipping the debarked tree, the resulting tree can be divided into separate boards for subsequent use as lumber.

Although only the preferred embodiment has been described above, one skilled in the art could conceive numerous variations without departing from the scope of the invention as encompassed by the following claims.

I claim:
1. A debarking/delimbing apparatus comprising:
a tree feed line through which trees are passed;
a lower flail drum disposed below the feed line, said lower flail drum having a series of flails extending radially outward from an axis of said lower flail drum towards said feed line, said axis of said lower flail drum being disposed in a fixed location relative to said feed line;
an upper flail drum disposed above said feed line, said upper flail drum having a series of flails extending radially outward from an axis of said flail drum, said upper flail drum being movable towards and away from said feed line to accommodate different size trees;

said flails extending from said upper and lower flail drums being long enough to reach to the center line of trees progressing along said feed line; and said upper and lower flail drums being oriented diagonally relative to said feed line at an angle greater than 0° and less than 90° relative to said feed line and said upper and lower flail drums being oriented at opposing angles, so that said axes of said upper and lower flail drums are transverse to one another, said upper and lower flail drums being fixed in position relative to said feed line during operation of said apparatus.

2. An apparatus as recited in claim 1, wherein the flails are chains.

3. An apparatus as recited in claim 1, wherein said upper flail drum is oriented at 120° relative to said feed line and said lower flail drum is oriented at +60° to said feed line.

4. An apparatus as recited in claim 1, wherein said upper flail drum is oriented at +60° relative to said feed line and said lower flail drum is oriented at 120° to said feed line.

5. An apparatus as recited in claim 1, wherein said upper flail drum moves towards and away from said feed line in response to a signal indicating the thickness of a tree moving along said feed line.

6. An apparatus as recited in claim 5, wherein said signal is generated by an electric eye.

7. An apparatus as recited in claim 5, wherein said signal is generated by an operator.

8. A debarking/delimbing apparatus comprising:
a pair of flail drums disposed above and below a feed line along which logs are fed, said flail drums each having a series of flails, extending radially outward from axes of each of said flail drums;

said flail drums being positioned so that said flails extend beyond the center line of a tree passing between said flail drums, each of said flail drums being oriented at an angle less than 90° and greater than 0° relative to said feed line;

the axis of said upper flail drum being transverse to the axis of said lower flail drum, said upper second lower flail drums being fixed in position relative to said feed line during operation of said apparatus.

9. An apparatus as recited in claim 8, wherein the flails are chains.

10. An apparatus as recited in claim 8, wherein said upper flail drum moves towards and away from said feed line to accommodate different size trees.

11. An apparatus as recited in claim 8, wherein one of said upper and lower flail drums has its axis oriented at an angle of 60° relative to said feed line and the other of said upper and lower flail drums has its axis disposed at an angle of 300° relative to said feed line.

12. An apparatus as recited in claim 8, wherein one of said upper and lower flail drums has its axis disposed at an angle 45° relative to said feed line and the other of said upper and lower flail drums has its axis oriented perpendicular to the axis of said first one of said flail drums.

13. An apparatus for processing a tree comprising:
means for feeding said tree;
means for debarking and delimbing said tree;
means for chipping said tree; and
means for loading chips,
wherein
said means for feeding, means for debarking and delimbing, means for chipping and means for chip loading are mounted on at least one frame and,
said frame is self-propelled,
wherein said apparatus is controlled by a single operator to propel said apparatus and operate said debarking and delimbing apparatus from a single station.

14. An apparatus as recited in claim 13, wherein said means for feeding, means for debarking and delimbing, means for chipping and means for chip loading are mounted on multiple frames by connection means.

15. An apparatus as recited in claim 14, wherein said multiple frames include a first frame and a second frame,
said first frame having said means for debarking and delimbing mounted thereon and a first pair of wheels,
said second frame having said means for chipping mounted thereon and a second pair of wheels, and
wherein said connection means is a hinge disposed between said first frame and said second frame.

16. An apparatus as recited in claim 13, wherein said trees are fed along a feed line through the debarking and delimbing means, and
wherein said debarking and delimbing apparatus further comprises:
a lower flail drum disposed below the feed line, said lower flail drum having a series of flails extending radially outward from an axis of said lower flail drum towards said feed line, said axis of said lower flail drum being disposed in a fixed location relative to said feed line;
an upper flail drum disposed above said feed line, said upper flail drum having a series of flails extending radially outward from an axis of said upper flail drum, said upper flail drum being movable towards and away from said feed line to accommodate different size logs;
said flails extending from said upper and lower flail drums being long enough to reach to the center line of logs progressing along said feed line; and
said upper and lower flail drums being oriented diagonally relative to said feed line at an angle greater than 0° and less than 90° relative to said feed line and said upper and lower flail drums being oriented at opposing angles so that said axis of said upper and lower flail drums are transverse to one another.

17. A method for debarking and delimbing a tree, comprising the steps of:
feeding said tree along a feed line;
debarking and delimbing said tree by moving said tree between flail drums disposed above and below said feed line, with said flail drums being disposed with an axis of said upper flail drum diagonal to said feed line and an axis of said lower flail drum being mounted on a diagonal to said feed line transverse to the axis of said upper flail drum, said upper and lower flail drums being fixed in position relative to said feed line when said apparatus is in operation.

18. A method as recited in claim 17, further comprising the steps of chipping said tree and loading said chips.

19. The method as recited in claim 17, further comprising the step of moving said upper flail drum towards and away from said feed line to accommodate different size trees.

20. The method as recited in claim 19, further comprising the step of sensing a tree size and performing said moving step in response to the size of said tree.

21. An apparatus as recited in claim 14, wherein said connection means is a hinge approximately located at a mid point of said apparatus to provide greater articulation of the apparatus.

* * * * *